United States Patent [19]

Witherspoon et al.

[11] 4,339,512
[45] Jul. 13, 1982

[54] BATTERY HAVING ELECTRODE WITH HYDROPHILIC POLYMER BINDER

[75] Inventors: Romeo R. Witherspoon, Utica; Stuart G. Meibuhr, Birmingham, both of Mich.

[73] Assignee: General Motors Corporation, Detroit, Mich.

[21] Appl. No.: 224,379

[22] Filed: Jan. 12, 1981

Related U.S. Application Data

[63] Continuation-in-part of Ser. No. 131,798, Mar. 19, 1980, abandoned.

[51] Int. Cl.³ ............................................. H01M 6/04
[52] U.S. Cl. ................................ 429/206; 429/217; 429/229
[58] Field of Search ............... 429/217, 206, 229–231, 429/223

[56] References Cited

U.S. PATENT DOCUMENTS

| | | | |
|---|---|---|---|
| 2,677,713 | 5/1954 | Weil et al. | 429/217 |
| 3,261,715 | 7/1966 | Solomon et al. | 136/50 |
| 3,271,195 | 9/1966 | Berchielli et al. | 136/67 |
| 3,706,601 | 12/1972 | Strier et al. | 136/20 |
| 3,848,027 | 11/1974 | Forbess et al. | 260/897 B |
| 4,041,221 | 8/1977 | Berchielli et al. | 429/229 X |
| 4,048,407 | 9/1977 | Boter | 429/217 |

OTHER PUBLICATIONS

"SWP Synthetic Fiber", Crown Zellerbach, Chem. Products Div., Camas, Washington, 98607, Dec. 1977.

*Primary Examiner*—Charles F. LeFevour
*Attorney, Agent, or Firm*—George A. Grove

[57] ABSTRACT

In a preferred embodiment is disclosed a zinc electrode for an alkaline zinc-nickel hydroxide cell wherein zinc-rich active electrode material is bonded to a conductive grid with hydrophilic polyethylene fibers.

5 Claims, 2 Drawing Figures

BATTERY HAVING ELECTRODE WITH HYDROPHILIC POLYMER BINDER

This is a Continuation-In-Part of our copending application, Ser. No. 131,798, filed Mar. 19, 1980 now abandoned.

This invention relates to zinc electrodes for use in secondary batteries of the alkaline electrolyte type. More specifically, this invention relates to a zinc electrode construction for a zinc-nickel hydroxide cell and method of preparation that utilizes hydrophilic polyethylene fibers as the reinforcing and binding material for the zincous electrode material.

Various forms of zinc electrodes have been evaluated for use in alkaline electrolyte secondary batteries. The zinc electrode serves as the negative electrode in the cells of such batteries in conjunction with suitable counter electrodes such as, for example, nickel hydroxide (NiOOH in charged form) or silver (silver oxide). There is general understanding of the reactions that take place during charging and discharging of these cells.

Powdered zinc oxide or zinc hydroxide is generally used as the zinc source in the preparation of the electrode and the zincous material is converted to zinc-metal during the battery forming or charging process. The zincous powder has to be held together in a working electrode. This has been accomplished by using reinforcing fibers and polymeric binder materials in mixture with the zinc oxide powder to form durable, relatively high strength electrode sheets that are permeable to the aqueous alkaline electrolyte and preferably wetted by it. The sheets in turn are pressed onto both sides of a suitable electrically conductive grid to make an electrode.

In a representative prior art zinc electrode construction asbestos fibers have been used as the reinforcing material and polystyrene has been used as the binder material for the zinc containing electrode material. Such electrodes have at least two disadvantages. It is not desirable to work with asbestos fibers in making the electrode because of their potential danger to health. Of more significance, however, is the fact that such electrodes when used in zinc-nickel hydroxide cells display undesirable characteristics during discharge. After a relatively low number of repeated charge/discharge cycles, the cell discharge voltage quickly falls from an initial level of about 1.6 volts to a low plateau of 1.1 to 1.2 volts. This low voltage plateau yields a low energy output (the product of current, voltage and time values) for the cell even though the cell capacity (the product of current and time) is high. With asbestos-styrene containing zinc electrodes this plateau usually first occurs after only 25 to 50 discharge/charge cycles.

It is an object of this invention to provide a zinc electrode for a secondary alkaline electrolyte battery cell formed using inexpensive, hydrophilic, polyethylene, fibrous material that is not injurious to health and serves to reinforce and bond together the zinc-containing material (and other additives) in the electrode.

It is a more specific object of this invention to provide a zinc electrode which, in its most basic form, is a paper-like sheet made from powdered zinc oxide or hydroxide and small hydrophilic polyethylene fibers. The sheet is applied to a conductive grid in the preparation of the working electrode. The resulting electrode is durable. It may be charged and discharged in a cell over a relatively large number of cycles, and upon discharge yields relatively high energy.

BRIEF SUMMARY OF THE INVENTION

In accordance with a preferred embodiment of our invention, these and other objects and advantages are accomplished by employing in the preparation of a zinc electrode a fibrous form of polyethylene fibers which have been treated with an aqueous solution of polyvinyl alcohol such that the fibers are dispersible in water. Although the fibers used in the preparation of our electrode are relatively short, typically 2 to 3 mm in length, they are highly branched or fibrillated so that they have a large specific surface area. Suitable such hydrophilic polyethylene fibers are commercially available from Crown Zellerbach Corporation under the designation "SWP ® Synthetic Fiber".

We form our zinc electrode in its uncharged state. Zinc oxide powder and hydrophilic polyethylene fibers are mixed with water in a high speed blender or other suitable mixing device. The hydrophilic polyethylene fibers serve as a reinforcing and binding material in the finished electrode. The amount of such fiber added to the zinc oxide powder is suitably in the range of 0.5% to 20% by weight of the total mixture. Preferably, the reinforcing binder fiber is employed in an amount of 4% to 7% by weight of a dry electrode preparation mixture containing zinc oxide or zinc hydroxide. At this time other materials may be mixed with the zinc containing powder and polyethylene fibers. An example of such an additive is mercuric oxide (HgO) which is suitably added to zinc electrodes in small quantities to suppress hydrogen formation during cell cycling.

The fluid mix is poured onto a vacuum table and the water is removed. A damp, paper-like sheet of a uniform mixture of zinc oxide, hydrophilic polyethylene fibers and other desired additives is thus formed. An electrode is assembled by pressing two such damp sheets onto opposite sides of a suitable conductive grid. An example of a conductive grid is a copper expanded metal sheet with a connector tab. The grid is preferably plated with a suitable lead-tin alloy. The assembled electrode is dried, encased in a separator and is then ready for assembly with one or more nickel hydroxide electrodes and a potassium hydroxide-based alkaline electrolyte into a secondary battery cell. The cell is charged by known means to convert the zinc electrode material to elemental zinc and the nickel electrode material to NiOOH. Our cell may be repeatedly discharged and recharged. We have found that our zinc electrodes have excellent physical and electrochemical properties. They have sufficient physical strength to be handled in the assembly and use of the cell. Furthermore, the discharge voltage of the cell does not rapidly drop to a low plateau value which reduces the energy capacity of the device.

These and other objects and advantages of our invention will be more fully appreciated from a detailed description thereof in which reference will be made to the drawings.

DETAILED DESCRIPTION

EXAMPLE 1

Figure 1:
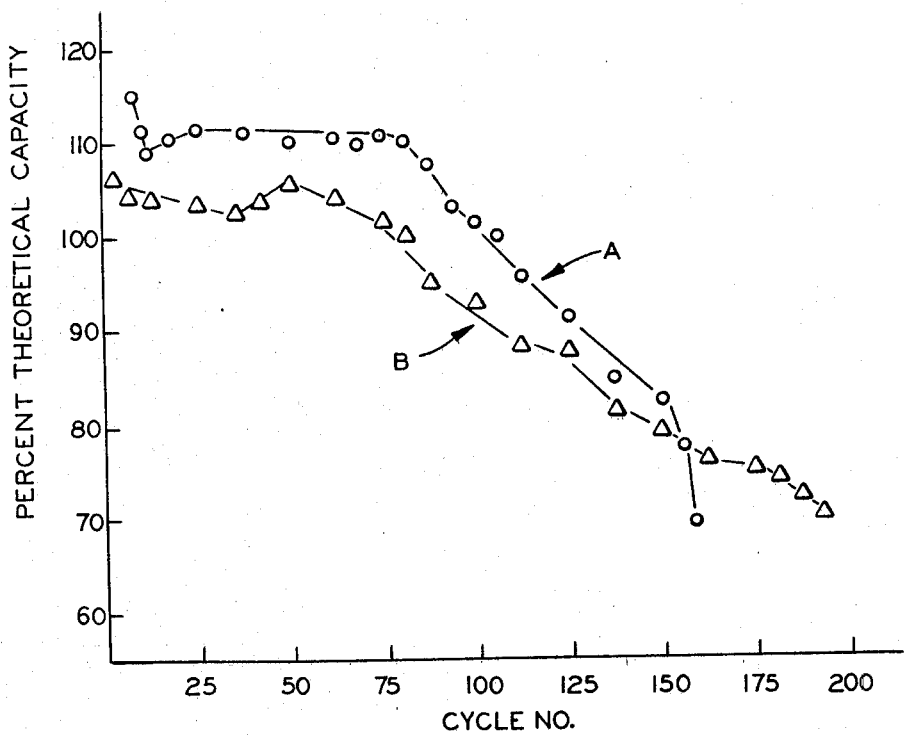
FIG. 1 is a graph comparing our zinc electrode with a prior art asbestos-styrene zinc electrode in zinc-nickel hydroxide cells, depicting how the capacity of cells decreases with repeated discharge and recharge cycling.

Preparation of our zinc electrode was started by first mixing (in parts by weight) 8.9 parts zinc oxide, 0.18 part mercuric oxide, and 0.45 part hydrophilic polyethylene fibers with 150 parts distilled water in a high speed Waring ® blender for two minutes. The hydrophilic polyethylene fibers employed were obtained from Crown Zellerbach Corporation under the designation "SWP E-620" fibers. They were high density polyethylene polymerized directly as fibers from ethylene gas. The individual fibers were highly branched (fibrillated) and had a high surface area of 8 to 12 $m^2/g$ as measured by gas absorption. The fibers had a Classified Fiber Length of 1.3 mm. This value is an average weighted fiber length measured in a Bauer-McNett ® classifier and expressed in millimeters. The fibers had been treated with an aqueous solution of polyvinyl alcohol and the treated fibers were hydrophilic and readily dispersible in water. The SWP E-620 fibers have a Drainage Factor of 6 seconds per gram. "Drainage Factor" is a water drainage rate of a 10 gram fiber sample measured in a standard British hand sheet mold.

The above-described fluid mix was poured onto a vacuum table using newsprint paper as the collecting support to form a moist, fibrous layer or sheet of the electrode mix. Pairs of such damp, white, paper-like sheets were pressed onto opposite sides of preweighed standard 90% lead–10% tin plated 5Cu7-2/O expanded copper sheet grids (4.8×4.8 centimeters) with spot welded connector tabs to form electrodes. The expanded metal grids were formed from sheets that were five mils thick. The width of the strands in the grid was seven mils. The damp sheets were pressed at 140 $kg/cm^2$. The electrodes were dried in air at 75° C., trimmed and weighed to allow calculation of the A.h capacity. Each electrode plate had an apparent area (counting back sides) of about 38 $cm^2$ and carried a total of about 4.5 g of zinc oxide. Each such uncharged zinc electrode (the negative electrode in a zinc-nickel hydroxide cell) had a nominal capacity of 3.0 A·h. The negative electrodes were encased in microporous polypropylene film separators (for example, Celgard ® 3401—Celanese Plastics Company).

Two nonsintered NiOOH electrodes, each of 0.5 A·h nominal capacity (half-positive electrodes), were used in the test cells employed in this work. The electrode composition initially contained by weight 81.4% KS-2 mix, 9.7% carbon fibers and 8.9% polytetrafluoroethylene particles (PTFE T30B) and was pressed into an expanded nickel sheet grid (7Ni7-2/O brick Distex ®) having welded Ni tabs. The KS-2 mix contained by weight 76% McGean nickel hydroxide, 4% cobalt hydroxide and 20% KS-2 graphite powder. The positive electrodes were encased in separator sheets formed of nonwoven polyamide felt (such as Pellon ® 2504K4) treated with fumed alumina.

For purposes of evaluating our zinc negative electrodes, small, low capacity cells were assembled in clear acrylic wall cell cases. Two separator-enclosed half-positive electrodes were positioned around a separator-enclosed negative electrode and carefully aligned. The electrodes were placed in the acrylic cell case using acrylic shims to position them tightly. No allowance was made for expansion of the positive electrode during charge formation. After the cell stack and appropriate shims were inserted into the cell case the grid tabs were respectively connected tightly to cell terminals. The acrylic cell top was positioned over the cell, and the cell was made liquid and gas tight using six tie-rods holding top and bottom aluminum plates together with the cell case and cell top in between.

The cells were filled with purified aqueous electrolyte containing 37-½% by weight potassium hydroxide plus 23 g/l lithium hydroxide ($LiOH.H_2O$) plus 60 g/l zinc oxide. The electrolyte level was above the separator opening around the conductor tab. The cells were vacuum-to-atmosphere cycled three times and allowed to soak for seventy-two hours. The electrolyte level was then adjusted to just below the top of the electrodes. The nominal capacity of this cell was 1.0 A.h.

The first formation cycle of the cell containing our zinc electrode consisted of a twenty hour charge at the C/10 rate of nominally 0.1 A, followed by a C/2 discharge at nominally 0.5 A until the cell output voltage dropped to 1.0 volt (from an initial discharge voltage of about 1.6 volts). The cell was then shorted to zero volts for two days to remove remaining zinc electrode capacity. A second formation cycle was employed consisting of only a twenty hour charge at the C/10 rate as above. At the end of this charge all excess free electrolyte was drained from the cell.

The cell was then connected to an assembly having a pressure gauge, a pressure relief valve, and gas sampling port and a valve for evacuation. Partially evacuating the cell to a pressure of 6kPa and tightly closing the valve completed cell sealing. Thus, the second discharge of the cell was the first sealed cell discharge. The cell was then tested by repeated subsequent discharge and charge cycles. Subsequent sealed discharges were at the C/2 rate (nominally 0.5 A) to a 1.0 volt cell output cutoff. Subsequent sealed cell charges were performed for six hours at the C/6 rate plus 5% or nominally 0.175 A. Cycling of the cell continued until its theoretical capacity had decayed to 75% of its original value, at which time the cell was considered as failed. All charging and discharging of the cells was accomplished with an eight-channel automatic cycler fed by one power supply.

A cell prepared as described above containing a zinc electrode prepared in accordance with our invention was thus subjected to repeated discharge and recharge cycles. The remaining capacity of the cell measured during each discharge cycle (expressed as percentage of theoretical capacity) is recorded in FIG. 1 (curve B). It is seen that the cell containing our zinc electrode with hydrophilic polyethylene fibers operated at greater than 100% capacity for 81 cycles and above 75% capacity for 181 cycles.

EXAMPLE 2

For purposes of comparison, a zinc-nickel hydroxide cell was prepared generally in accordance with the procedure outlined in Example 1 except that a different reinforcing and binding composition was used in the zinc electrodes. The starting composition added to the blender in this example was, by weight, 90% zinc oxide, 2% mercury oxide, 4% styrene, and 4% asbestos fibers. In other regards the procedures followed and the materials used were substantially the same as employed in electrode preparation, cell assembly and cell charging as described in Example 1. The styrene-asbestos zinc electrode containing cell was repeatedly charge/discharge cycled. The remaining capacity of the cell measured during each discharge cycle (expressed as percentage of theoretical capacity) is recorded in FIG. 1 (curve A). It was found to retain a capacity greater than 100% theoretical capacity for 90 cycles. However, the cell fell below 75% of its theoretical capacity after only 155 cycles.

It is seen by comparing the results of Examples 1 and 2 that a zinc electrode of our design and composition offers a significant improvement in cycle life over the styrene-asbestos containing zinc negative electrode.

Figure 2:
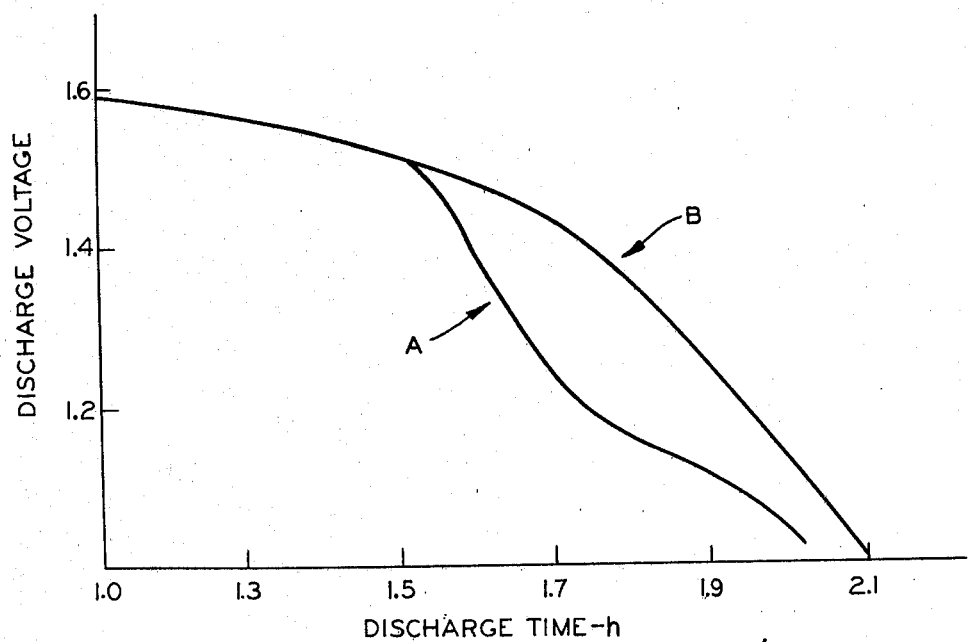
FIG. 2 is a graph comparing our zinc electrode with an asbestos-styrene zinc electrode in zinc-nickel hydroxide cells, depicting how the discharge voltage of such cells decreases with discharge time in their seventy-sixth (76th) discharge cycle.

FIG. 2 illustrates another important characteristic of our zinc electrode. During each discharge cycle of a nickel-zinc cell the discharge voltage is initially about 1.6 volts but decreases as the cell is discharged. In our testing, the discharge cycle was terminated when the cell output voltage reached one volt. Obviously it is preferable that the discharge voltage of a cell remain as high as possible during discharge because the discharge voltage is a factor in the energy output of the cell.

In the repeated charge/discharge cycling of styrene-asbestos zinc electrode containing cells the discharge voltage repeatedly falls off to a low plateau that appears between 1.1 and 1.2 volts. This low voltage causes a low energy output for the cell even though its current producing capacity is high. This decrease in voltage with time of the styrene-asbestos zinc electrode cell is depicted in curve A of FIG. 2. This data was obtained during the seventy-sixth cycle of the nickel-zinc cell. Surprisingly, the discharge voltage of our hydrophilic polyethylene zinc electrode containing cell decreases at a much lower rate. The cell, therefore, has a significantly higher energy output. The discharge voltage output of our cell with time during discharge cycle number 76 is shown in curve B of FIG. 2.

Thus, the important feature of our invention is the use of water-wettable and dispersible polyethylene fibers as the dual purpose binder and reinforcing ingredient to hold the zinc containing active electrode powders together and bond them in a thin sheet to a suitable current collector. We have successfully employed different grades of fibrillated, high density polyethylene fibers supplied commercially by Crown Zellerbach Corporation under the designation SWP (Super Wettable Polyethylene) synthetic fibers. The grades varied in fiber length and degree of wettability. In general, fibers having average lengths from about 1 to 2½ mm are suitable for use in our zinc electrode. We have successfully used SWP fiber grades E-620, E-790 and R-830 which had drainage factors (as defined in Example 1 above) ranging from 1 to 10 sec/gm. The degree of wettability is determined by the number of hydrophilic groups incorporated in the polyethylene polymer during the manufacturing process. The greater the wettability by water, the lower the drainage.

Hydrophilic polyethylene fibers may be prepared by treating the fibers, even while swollen with an organic solvent, with an aqueous solution of polyvinyl alcohol such as described in U.S. Pat. No. 3,848,027, issued Nov. 12, 1974, to Forbess et al, entitled "Method of Preparing Water-Dispersible Polyolefin Fibers and Product Formed Therefrom", and incorporated herein by reference. The aqueous polyvinyl alcohol solution may be used in a steam distillation treatment to remove organic solvent from the polyethylene fibers. After the solvent has been removed and the fibers removed from the aqueous polyvinyl alcohol solution the treated fibers are dispersible in water.

A sample of SWP E-620 fibers was boiled in toluene and about 80% by weight of the material dissolved. An infrared spectrum of the toluene soluble material indicated that it was substantially pure polyethylene. The toluene insoluble portion appeared to be polyvinyl alcohol mixed with polyethylene. A fresh fiber sample was extracted with boiling water. On evaporating to dryness, the water extract gave an infrared spectrum of substantially pure polyvinyl alcohol. The water soluble portion comprised 1.6 weight percent of the total sample weight. It was concluded that the hydrophilic fibers were a physical mixture of polyethylene and polyvinyl alcohol.

As stated above, the amount of the hydrophilic polyethylene fiber added to zinc oxide (or its equivalent in the preparation of a zinc electrode) may vary from amounts as low as 0.5 weight/percent to 20 weight/percent of the total matrix. Preferably, the hydrophilic fibers are used in an amount of 4% to 7% by weight of the dry mixture before dispersing in water for mixing and electrode sheet formation. It is known that calcium hydroxide may be added to the zinc oxide for the purpose of reducing its solubility and mobility in the alkaline electrolyte. For this purpose about 0.25 to 1.5 moles of the calcium compound per mole of zinc oxide has been suggested. It is also known that small quantities of lead (as in the form of $Pb_3O_4$) may advantageously be added to the zinc containing mixture to improve the efficiency of the cell. If additives such as the calcium or lead compounds are mixed with the zinc containing active material, the amount of polyethylene fiber employed is based on the total of all such materials.

Thus, we have provided a zinc electrode for use in an alkaline electrolyte secondary cell of good physical strength and high energy output using as a reinforcing and binding binder relatively low cost hydrophilic polyethylene fibers which are not injurious to health. While our invention has been described in terms of preferred embodiments thereof, it will be appreciated that other embodiments could be adapted and the scope of our invention is to be considered limited only by the following claims.

The embodiments of the invention in which an exclusive property or privilege is claimed are defined as follows:

1. An alkaline zinc-nickel hydroxide cell comprising in combination a nickel hydroxide electrode, a zinc electrode spaced from said nickel hydroxide electrode and comprising a conductive grid embedded in zinc rich particles and sufficient hydrophilic polyethylene fibers to bind said particles in place on said grid, and an aqueous alkaline electrolyte bridging the space between the electrodes.

2. An alkaline zinc-nickel hydroxide cell comprising in combination a nickel hydroxide electrode, a zinc electrode spaced from said nickel hydroxide electrode and an aqueous alkaline electrolyte bridging the space between the electrodes, said zinc electrode comprising a conductive grid embedded in zinc rich particles bound to said grid with polyethylene fibers containing sufficient polyvinyl alcohol so as to be hydrophilic.

3. An alkaline zinc-nickel hydroxide cell comprising in combination a nickel hydroxide electrode, a zinc electrode spaced from said nickel hydroxide electrode and an aqueous alkaline electrolyte bridging the space between the electrodes, said zinc electrode comprising a conductive grid embedded in zinc rich particles bound to said grid and reinforced with a reinforcing binder material consisting of short polyethylene fibers that have been treated with polyvinyl alcohol such that said fibers are wettable by said electrolyte.

4. A zinc electrode adapted for use in an alkaline zinc-nickel hydroxide cell to provide improved cell discharge voltage during prolonged charge/discharge cycling, said electrode comprising an electrically conductive grid embedded in zinc rich particles bound to said grid with hydrophilic polyethylene fibers.

5. A zinc electrode adapted for use in an alkaline zinc-nickel hydroxide cell to provide improved cell discharge voltage during prolonged charge/discharge cycling, said electrode comprising an electrically conductive grid embedded in zinc rich particles bound to said grid with polyethylene fibers containing sufficient polyvinyl alcohol so as to be hydrophilic.

* * * * *